Feb. 4, 1958 M. M. SAMFIELD ET AL Re. 24,424
COMPOSITION OF MATTER CONSISTING CHIEFLY OF FRAGMENTED TOBACCO AND GALACTOMANNAN PLANT GUM
Original Filed May 28, 1954
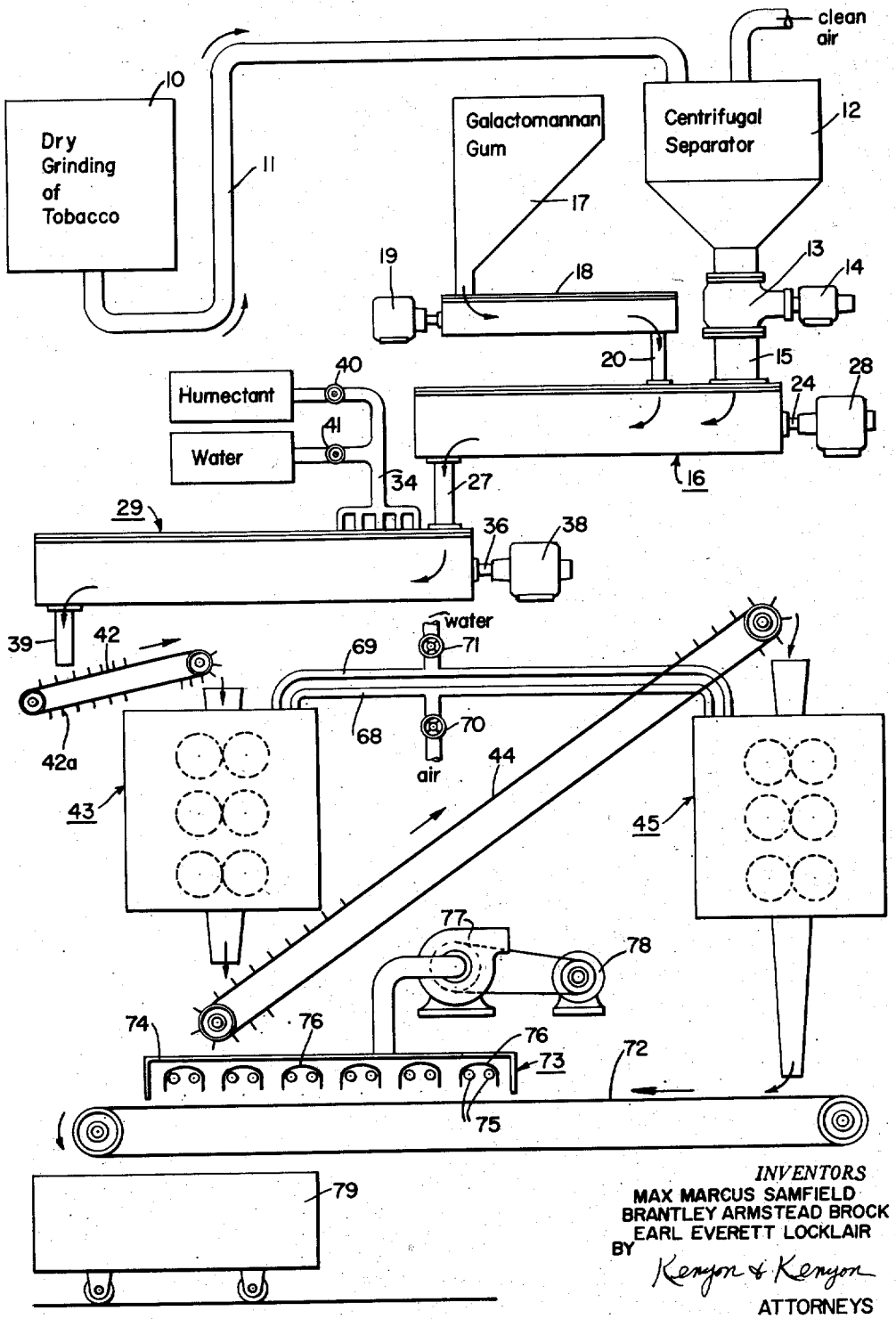
INVENTORS
MAX MARCUS SAMFIELD
BRANTLEY ARMSTEAD BROCK
EARL EVERETT LOCKLAIR
BY Kenyon & Kenyon
ATTORNEYS United States Patent Office Re. 24,424
Reissued Feb. 4, 1958

24,424

COMPOSITION OF MATTER CONSISTING CHIEFLY OF FRAGMENTED TOBACCO AND GALACTOMANNAN PLANT GUM

Max Marcus Samfield, Brantley Armstead Brock, and Earl Everett Locklair, Durham, N. C., assignors to Liggett & Myers Tobacco Co., New York, N. Y., a corporation of New Jersey Original No. 2,708,175, dated May 10, 1955, Serial No. 433,062, May 28, 1954. Application for reissue March 1, 1956, Serial No. 568,956

9 Claims. (Cl. 131—17)

Matter enclosed in heavy brackets [ ] appears in the original patent but forms no part of this reissue specification; matter printed in italics indicates the additions made by reissue.

This invention relates to a composition of matter consisting chiefly of fragmented tobacco and galactomannan plant gum so combined as to be suitable for blending with leaf tobacco in the manufacture of cigarettes, cigars and other forms of smoking tobacco.

Between the time leaf tobacco is received for conversion into smoking products, and the completion of the process in which it is stemmed, dried, cased, cut and blended into a form suitable for manufacture of cigarettes and the like, a considerable amount of fragmented tobacco or so-called tobacco fines are produced. Tobacco in this form is at present either used in the manufacture of low-priced unprofitable products, or sold at a low price for conversion into fertilizer or tobacco by-products. Actually these tobacco fines are high quality material of composition suitable for use in cigarettes, cigars and other tobacco products if they could first be physically reconstituted into sheet form and thus made available for blending with leaf tobacco.

The problem of preventing loss in tobacco values through fragmentation of leaf tobacco is an old one in the cigarette and cigar-making business. Many proposals have been advanced for the reconstitution of tobacco in coherent sheet form. Early proposals were to pulp the fragmented tobacco in a water slurry and form it into sheets by methods resembling those used in the manufacture of paper. Later proposals were to grind the tobacco in water to form a colloidal suspension of exceedingly fine particles of tobacco in an aqueous matrix which is then extruded and dried in sheet form. Each of these procedures has been found to affect unfavorably the smokability and flavor of the tobacco, probably because soluble flavoring elements are either leeched out or hydrolyzed. More recently another process has been proposed, in which dry-ground tobacco is mixed with three to four or more times its own weight of an aqueous solution of one of the water soluble forms of cellulose derivative or of an alginic or pectinic acid polysaccharide, the mixture being formed into sheets and dried to expel most of the water. But this last-named process has found only a limited use in the manufacture of low-priced tobacco products, because the nature of the binder and the need to use large amounts of water have caused a serious alteration in the smoking taste of the product.

In making the composition of matter according to the present invention certain of the following steps are carried out: dry-ground tobacco and a quantity of mucilaginous plant gum, each in the form of a dry finely-divided powder, are mixed and then worked together without wetting until the two powders are dispersed in each other with substantial uniformity; a limited and relatively small amount of water, with added humectant or plasticizer if desired, is added to the mixed powders while the latter are being tumbled or agitated together in such manner that local concentration of water in excessive amounts is prevented, as for instance by use of a finely divided mist or spray; the dampened mixture of powders is subjected to working under mechanical shearing action while in moist condition, for example by passage between one or more pairs of closely-spaced steel rollers revolving at different peripheral speeds; moisture is sprayed on one or both such rollers while the mixture passes between them; and the worked mixture is formed into thin damp sheets on a support, which may be movable, and are subjected to heat whereby most of the water is evaporated off in a few seconds, thus producing flexible sheets having about the tensile strength of leaf tobacco and blendable with leaf tobacco into a smoking product whose taste, flavor and aroma are indistinguishable from an all-leaf mixture of the same initial blend.

The preferred mucilaginous plant gum is that which consists essentially of galactomannan. As commercially available, such gums consist of 80% to 90% galactomannan, 10% to 15% water, and the balance ash and protein. They are commonly sold in the form of a dry powder. Galactomannan is a high molecular-weight branched polysaccharide substance composed almost wholly of the sugars D-galactose and D-mannose. It is substantially free of uronic acids or uronides. Depending on the particular plant source from which it is derived, it consists predominantly or mainly of D-mannose in proportions running from about 60% to about 86% of the polysaccharide. "Guar gum" which is obtained from guar seed endosperm and consists principally of galactomannan is the preferred binder material for use according to this invention. "Locust bean gum" which is obtained from the seed of the carob tree and also consists principally of galactomannan may also be used. Such gums, consisting principally of galactomannan, when burned in small amounts with tobacco, produce no detectable change in the taste, flavor or aroma of the tobacco smoke.

The composition of matter according to this invention consists essentially of a major proportion of fragmented tobacco and a minor proportion of galactomannan plant gum, plus added moisture either water alone or water and a suitable humectant, this composition being preferably in the form of a coherent sheet having a flexibility, thickness and tensile strength approximating that of natural tobacco leaf.

The mixing of galactomannan gum with tobacco is carried out while each is in the form of a finely-divided dry powder, and preferably a somewhat extended and intimate mixing is employed to bring about a substantially uniform dispersion of each powder in the other. The desirable relative proportions of each are mentioned below.

Moistening of the mixed dry powders is preferably carried out by some means which tumbles and agitates the mixture of powders and introduces the water, or water plus humectant or plasticizer, into the mixture in a manner which avoids local concentrations of moisture. Since it is often desirable to incorporate a small amount of glycerine, or other humectant, in the finished sheet material, this substance being miscible with water is most conveniently introduced when the water is introduced. Hence the mixed dry powders are, accordingly to the preferred form of this invention, moistened with a liquid which is itself a mixture of water and glycerine.

The working of the dampened mixed powders may be carried out in any suitable apparatus which is adapted to apply a shearing action while the mixture is in moist condition. Such shearing action or its equivalent appears necessary to the subsequent formation of coherent sheets. When adequately worked the material acquires excellent sheeting properties. A sufficient amount of working is given to the material when it has been passed between, for example, six pairs of rollers each pair defining a space between them of about 0.004 inch, with the periphery of one roller in each pair travelling at a higher linear rate of speed than that of the other roller at the point of closest approach between them. In this way a wiping action is produced, the sheet tending to stick to the faster moving roll from which it is taken off by a doctor blade. In this wiping action tobacco particles and plant gum particles, each slightly moistened, are rubbed together and it is believed that relatively sticky mucilaginous matter in microscopic amounts is thereby spread over the surfaces of the tobacco particles. The sheared material may drop by gravity from one such roller-pair to another, arranged in a vertical flight and finally deposited upon a support such as a moving belt or screen in the form of a continuous coherent damp sheet or a series of such sheets of small size.

Since the use of some lubricant is often found to be necessary on the rollers, and water or glycerine or a mixture thereof will serve the purpose, it is within the scope of this invention to introduce part at least of the desired moistening liquid—whether water or humectant or both—into the tobacco-galactomannan mixture during the shearing operation itself. This may be done by continually moistening the rollers as they turn, and of the total moisture intended to be introduced into the tobacco-galactomannan mixture a considerable part may be introduced during shearing rather than during the mixing stage.

The sheet, without being disturbed in its position on the belt or screen, may then be passed through a dryer, preferably an overhead infra-red electric resistance heater, where a major part of the contained moisture is evaporated within a few seconds, leaving the sheet with a moisture content roughly approximating that contained in the leaf tobacco with which the sheet material is thereupon to be blended. Upon emerging from the dryer the sheet material may, for example, be about 0.014 inch in thickness, and will be found to have a color approximating that of the tobacco used and a tensile strength roughly equal to that of leaf tobacco. If desired, such sheet material may be broken up in suitable equipment before passing to the blending machine.

The proportions by weight of galactomannan gum and water in the dampened and worked material before drying may vary considerably. In the damp mix, galactomannan gum may run from a minimum of about 0.75% to a maximum of about 10%, the water from about 12% to about 60%, with up to about 10% of the water being replaced by a like weight of glycerine or other humectant if desired, and the balance essentially tobacco. A damp mixture which has been found satisfactory consisted of 2.9% of guar gum, 48.3% water and humectant including the natural water-content of the tobacco, and 48.8% tobacco taken on a bone-dry basis.

The finished composition of matter consists essentially of a minor proportion, about 1% to 20% by weight, of galactomannan gum, preferably guar gum but including also locust bean gum, an amount of moisture roughly equal to the amount of moisture commonly present in natural tobacco leaves as prepared for blending, that is, approximately 9% to 13% by weight of the total composition, and the balance a major proportion of dry-ground tobacco with the individual fragments thereof in finely-divided form and bound together in coherent preferably sheet-like form having a tensile strength roughly equal to that of natural leaf tobacco as prepared for blending. Optionally the composition may include a humectant such as glycerine. The foregoing composition will, when formed in a sheet about 0.014 inch thick, which is about the thickness of natural leaf tobacco, have a flexibility and tensile strength approximately equal to that of such leaf tobacco. A finished sheet ready for blending and having excellent handling and smoking qualities, produced by the process above described, consists of 4.6% guar gum, 11.5% water, 5.6% glycerine, and 78.3% tobacco taken on a bone-dry basis.

*If a damp mix is prepared as above described with the specified maximum of 10% of the water replaced by glycerine or other humectant, and such mix is then subjected to the described process to produce the finished sheet of this invention, it can be calculated from the figures given in the second preceding paragraph that the maximum amount of glycerine or other humectant present in the finished sheet is about 12%. For example, using figures given in the second preceding paragraph, if a damp mix consisting of 10 lbs. of galactomannan gum, 60 lbs. of a mixture of water and glycerine with one-tenth of this mixture (6 lbs.) being glycerine or other humectant and the rest (54 lbs.) water, and the balance 30 lbs. of finely-ground dry tobacco, making 100 lbs. in all, is treated as herein described so as to evaporate sufficient water to produce a finished sheet according to the invention containing 9% of water, the glycerine content of such sheet by calculation is about 12%. If less water is evaporated so as to leave about 13% water in the finished sheet, the glycerine content is then about 11.3%. Thus about 12% is the maximum permissible content of glycerine or other humectant in the composition of matter according to this invention.*

Referring to the annexed drawing, which illustrates diagrammatically one form of apparatus useful in manufacturing the composition of matter herein claimed, fragmented tobacco is fed to hammermill 10 in which it is dry-ground to particles of the desired size. These particles are propelled by a blower (not shown) through conduit 11 to centrifugal separator 12 whence the tobacco particles pass through proportioning valve 13, controlled by a motor 14, and pipe 15 to mixer 16.

Galactomannan gum in the form of a dry powder is fed from hopper 17 to proportioning feeder 18 driven by motor 19, and is thence delivered through pipe 20 to mixer 16. Motors 14 and 19 are electrically interrelated to assure delivery of desired portions of tobacco and gum.

A flight conveyor screw (not shown) within mixer 16 driven through shaft 24 by motor 28 effects intimate mixing of dry tobacco and dry gum during the time these substances are being propelled lengthwise through mixer 16. The mixed product is discharged through pipe 27 to moistener 29.

Moistener 29 contains a series of paddles (not shown) mounted on shaft 36 propelled by motor 38, which propels and agitates the mixed tobacco and gum powders, ultimately discharging them in moistened condition through pipe 39. The supply of moisture to moistener 29 may consist either of water alone, or of water plus a desired humectant such as glycerine. These liquids pass from sources as shown, controlled by valves 40 and 41, through pipe 34 to a series of jet sprays (not shown) discharging within moistener 29.

The moistened mixture received from pipe 39 is conveyed by belt 42 to a roller mill 43. If desired this belt may be equipped with ridges or flanges 42a which separate the material into small distinct masses. Roller mill 43 preferably comprises a plurality of pairs of powered rollers, the rollers of each pair having parallel axes and being arranged to form a narrow pass between them, for example a pass of .004 inch in width, at the point of closest approach. Successive pairs are mounted in superposed relation so that material discharged from an upper pair falls by gravity into a bite of the next lower pair. Preferably, six such pairs are provided, and preferably these are divided so there are three in one vertical flight in one mill 43, and three more in another vertical flight in a second mill 45, with provision as by conveyor 44 to transfer material issuing from the bottom of the first mill to the receiving hopper of the second mill.

If desired, additional quantities of water may be supplied to the rollers, for example in the form of an atomized spray through spray nozzles (not shown). For this purpose water may be supplied from a suitable source controlled by valve 71 through header 69 for delivery to the respective mills.

If desired, doctor blades (not shown) may be provided to cooperate with the respective rollers and, to facilitate cleaning such blades, may be actuated to and from operative positions by means of actuating mechanism (not shown) powered by compressed air, furnished from a suitable source controlled by valve 70 to the header 68 for distribution to the respective mills.

Dampened mixture delivered by the last roller-pair of mill 45 may be deposited on the horizontal surface of a moving belt 72. Preferably the feed to the mills is so arranged that the material is delivered to belt 72 in the form of small batches, with an appreciable interval of time between batches, thus forming on belt 72 a succession of small separate sheets of damp material. These sheets are transported by belt 72 so as to pass under heater 73.

Heater 73 comprises a hood 74 and a series of infrared resistance heater units 75, 75, preferably arranged in pairs under reflectors 76. Fan 77 powered by motor 78 draws air from the hood. Sheet material on belt 72, after passing beneath heater 73, is then discharged as for example into cart 79. Such sheets should be of a size suitable for handling in tobacco blending operations and have a thickness and tensile strength approximately equal to natural tobacco leaves. Such material is then ready for blending in the further stages of manufacture of tobacco products.

The following example illustrates in detail a specific process for the production of the composition of matter embodying the invention:

Tobacco was ground in hammer mill 10 until from about 20% to 35% would pass through a 140-mesh screen and from about 0.5% to 10% would remain on a 30-mesh screen, with the ratio of coarse to fine particles being random within these limits.

The guar gum, the galactomannan used in this example, was of about the same degree of fineness as the ground tobacco.

The roller mills 43 and 45 contained six roller-pairs, the spacing at each bite being 0.004 inch. Each roller was 8½ inches in diameter. One roller in each pair was rotated at 60 R. P. M., the other at 45 R. P. M. This meant a peripheral velocity at the bite between them of about 130 and about 95 feet per minute respectively.

About 780 lbs. per hour of fragmented tobacco containing about 8% moisture fed through pipe 15 to mixer 16; about 46 lbs. per hour of guar gum (consisting of 78.5% guar galactomannan, 12% moisture, 4.5% ash and 5% protein), fed through pipe 20 to mixer 16; a mixture consisting of about 68 gallons (568 lbs.) per hour of water and 5 gallons (50 lbs.) per hour of glycerine fed through pipe 34 to moistener 29 and about 17 gallons (142 lbs.) per hour of additional water supplied to the rollers produced a total of about 1586 lbs. per hour of damp mixture delivered by the second roller mill 45 to screen 72. Screen 72 travelling at 132 ft. per minute through a dryer 74 about 32 ft. long containing electrical resistance elements 75 about 3 inches above screen 72 to which 1.3 million B. t. u. per hour (384 kw.) was fed, caused the evaporation of about 650 lbs. of water per hour, and the production of about 936 lbs. per hour of coherent sheet material resembling leaf tobacco in its flexibility and strength and having a moisture content of about 12%. When about 3% of such sheet material was blended with about 97% of leaf tobacco similar in blend to the original fragmented tobacco and the blend was incorporated in a cigarette, the smoking qualities of the latter were indistinguishable from those of a cigarette made wholly of the same blend of all leaf tobacco.

What is claimed is:

1. A composition of matter suitable for smoking consisting by weight of a minor proportion, about 1% to 20%, of a plant gum consisting essentially of galactomannan, approximately 9% to 13% of moisture, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.

2. A composition of matter suitable for smoking consisting by weight of a minor proportion, about 1% to 20%, of guar gum, approximately 9% to 13% of moisture, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.

3. A composition of matter suitable for smoking consisting by weight of a minor proportion, about 1% to 20%, of locust bean gum, approximately 9% to 13% of moisture, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.

*4. A composition of matter suitable for smoking consisting by weight of a minor proportion, about 1% to 20%, of a plant gum consisting essentially of galactomannan, approximately 9% to 13% of water, a humectant in an amount not exceeding about 12%, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.*

*5. A composition of matter suitable for smoking consisting by weight of a minor proportion, about 1% to 20%, of guar gum, approximately 9% to 13% of water, a humectant in an amount not exceeding about 12%, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.*

*6. A composition of matter suitable for smoking consisting by weight of a minor proportion, about 1% to 20%, of locust bean gum, approximately 9% to 13% of water, a humectant in an amount not exceeding about 12%, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.*

*7. A composition of matter suitable for smoking consisting by weight of a minor proportion, about 1% to 20%, of a plant gum consisting essentially of galactomannan, water in an amount approximately equal to the amount of water commonly present in natural tobacco leaves as prepared for blending, a humectant in an amount not exceeding about 12%, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.*

*8. A composition of matter suitable for smoking consisting by weight of a minor proportion, about 1% to 20%, of guar gum, water in an amount approximately*

*equal to the amount of water commonly present in natural tobacco leaves as prepared for blending, a humectant in an amount not exceeding about 12%, and the balance essentially all dry-ground tobacco with the individual finely-divided fragments thereof cohered together so as to have, when formed in sheets of about the thickness of natural leaf tobacco, a tensile strength approximately equal to the tensile strength of such leaf tobacco.*

*9. A composition of matter consisting by weight of about 4.6% guar gum in finely-divided form, about 11.5% water, about 5.6% glycerine, and about 78.3%, taken on a bone-dry basis, of dry-ground finely-divided tobacco, the fragments of tobacco being cohered together in the form of a flexible sheet having approximately the*

*thickness and tensile strength of leaf tobacco as prepared for blending.*

References Cited in the file of this patent or the original patent

UNITED STATES PATENTS

| | | |
|---|---|---|
| 64,591 | Stayman | May 7, 1867 |
| 137,084 | Kerr | Mar. 25, 1873 |
| 587,184 | Cohen | July 27, 1897 |
| 1,808,707 | Wiggins | June 2, 1931 |
| 2,003,690 | Lewton | June 4, 1935 |
| 2,592,553 | Frankenburg | Apr. 15, 1952 |
| 2,592,554 | Frankenburg | Apr. 15, 1952 |